H. C. TOLBERT.
BEAN HARVESTER.
APPLICATION FILED NOV. 18, 1918.
1,306,204.
Patented June 10, 1919.
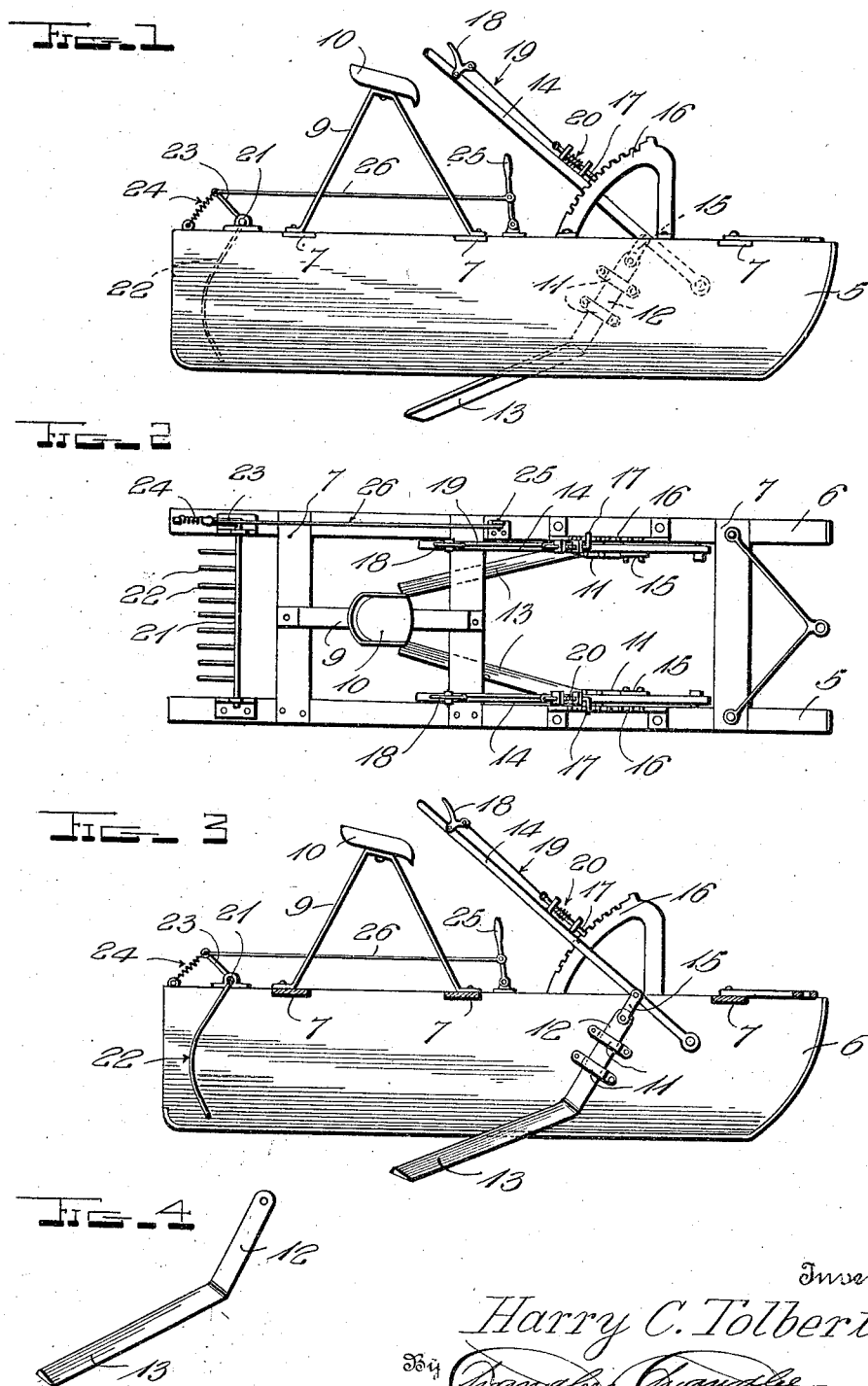
Inventor
Harry C. Tolbert

UNITED STATES PATENT OFFICE.

HARRY C. TOLBERT, OF HOYT, COLORADO.

BEAN-HARVESTER.

1,306,204.  Specification of Letters Patent.  Patented June 10, 1919.

Application filed November 18, 1918. Serial No. 263,041.

*To all whom it may concern:*

Be it known that I, HARRY C. TOLBERT, a citizen of the United States, residing at Hoyt, in the county of Morgan, State of Colorado, have invented certain new and useful Improvements in Bean-Harvesters; and I do hereby declare the following to be a full, clear, and exact description of the invention, such as will enable others skilled in the art to which it appertains to make and use the same.

This invention relates to bean harvesters of the sled type and it has for its object to provide an implement of such economy of structure as to permit of its use not only in extensive harvesting but also on limited areas.

A further object of the invention is to provide for independent adjustment of the harvesting knives to suit the various conditions encountered in the harvesting operation and furthermore to provide an implement which as a whole may be readily operated from the driver's seat.

In the drawings:

Figure 1 is a side elevation of the harvester.

Fig. 2 is a top plan view.

Fig. 3 is a central longitudinal section.

Fig. 4 is a detail perspective view of one of the harvesting knives.

Referring to the drawings, the harvester comprises a sled including a pair of usual parallel runners 5 and 6 which are connected by cross braces 7 to provide a rigid structure and upon the rearmost cross braces are mounted the supports 9 of a seat 10 disposed above and centrally for the driver and operator.

Each of the runners 5 and 6 is provided upon its inner face with spaced guides 11 through which is slidably disposed the straight flat shank portion 12 of the harvesting knife, this shank having a slight slant rearwardly from its upper to its lower end, as illustrated.

At the lower end of the shank 12, there is a blade 13 which progresses downwardly and rearwardly in the direction of the opposite runner and has a longitudinal cutting edge disposed toward the front of the sled.

Pivoted against the inner face of each runner, forwardly of the corresponding harvesting knife is a hand lever 14 connected with the corresponding knife by means of a pivoted link 15, the lever inclining rearwardly to a point in advance of and to the corresponding side of the seat 10 so as to be readily grasped and operated by an occupant of the seat. As the rear end of the lever is raised and lowered, the shank of the knife is correspondingly moved through the guides 11 to raise and lower the blade of the knife.

To hold the lever with the knife in its different adjusted positions, there is mounted upon the runners a notched segment 16 to receive a latch 17 connected with a release trigger 18 through the medium of a rod 19 having the usual returning spring 20 common in structures of this character.

As above stated, both runners have this same knife equipment and the blades of these knives approach very closely at their rear ends so that as the sled is drawn forwardly and the blades engage under and cut the beans, the latter are directed to and are deposited in a single row.

At the rear of the sled is provided a rake comprising a shaft 21 that is rockingly mounted in suitable bearings upon the upper edges of the runners and from which depend the curved tines 22 the lower end portions of which are directed forwardly. At one end of the shaft 22 is an upwardly and rearwardly directed crank arm 23 to which is attached a spring 24 attached also to the corresponding runner to hold the rake normally yieldable with the tines as above explained so that as the sled progresses they will engage and collect the vines. When the pressure of the collected vines is sufficient to overcome the spring 24, the tines swing rearwardly and upwardly to dump the vines in a windrow.

To operate the rake to dump the vines before the accumulation just stated, a foot lever 25 is mounted upon the corresponding runner in advance of the seat 10 and is connected with the crank arm 23 by means of a rod 26.

It will be noted that the structure described is extremely simple, that it may be manufactured at a low cost and that the rake may be operated and the knives adjusted from the operator's seat, while the independent adjustment of the knives permits of efficient operation where the surface of the earth is of varying contour.

What is claimed is:

1. A bean harvester comprising a sled having a harvesting knife mounted upon each runner, each knife including a straight shank longitudinally slidable on the runner and extending downwardly and rearwardly thereof and a blade extending from the lower end of the shank laterally, downwardly and rearwardly, and independent means for adjusting the shanks with their blades, with respect to the bottom edges of the runners.

2. A bean harvester comprising a sled including spaced runners and connecting braces, a seat supported from the rear portions of the runners, an oscillatory rake mounted upon the runners rearwardly of the seat, a foot lever mounted upon a runner forwardly of the seat and operatively connected with the rake to oscillate it, a harvesting knife slidably mounted upon each runner for movement toward and away from the lower edge thereof and each including a laterally, downwardly and rearwardly directed blade, a lever pivoted to each runner in advance of the corresponding knife and connected with the latter to effect its adjustment, said levers extending adjacent opposite sides of the seat and means for holding the levers in different positions.

In testimony whereof, I affix my signature, in the presence of two witnesses.

HARRY C. TOLBERT.

Witnesses:
C. J. TOLBERT,
A. L. GRAY.

Copies of this patent may be obtained for five cents each, by addressing the "Commissioner of Patents, Washington, D. C."